Feb. 21, 1939. J. E. PARKER 2,148,419
IRRIGATION WATER DISTRIBUTOR
Filed Nov. 15, 1937
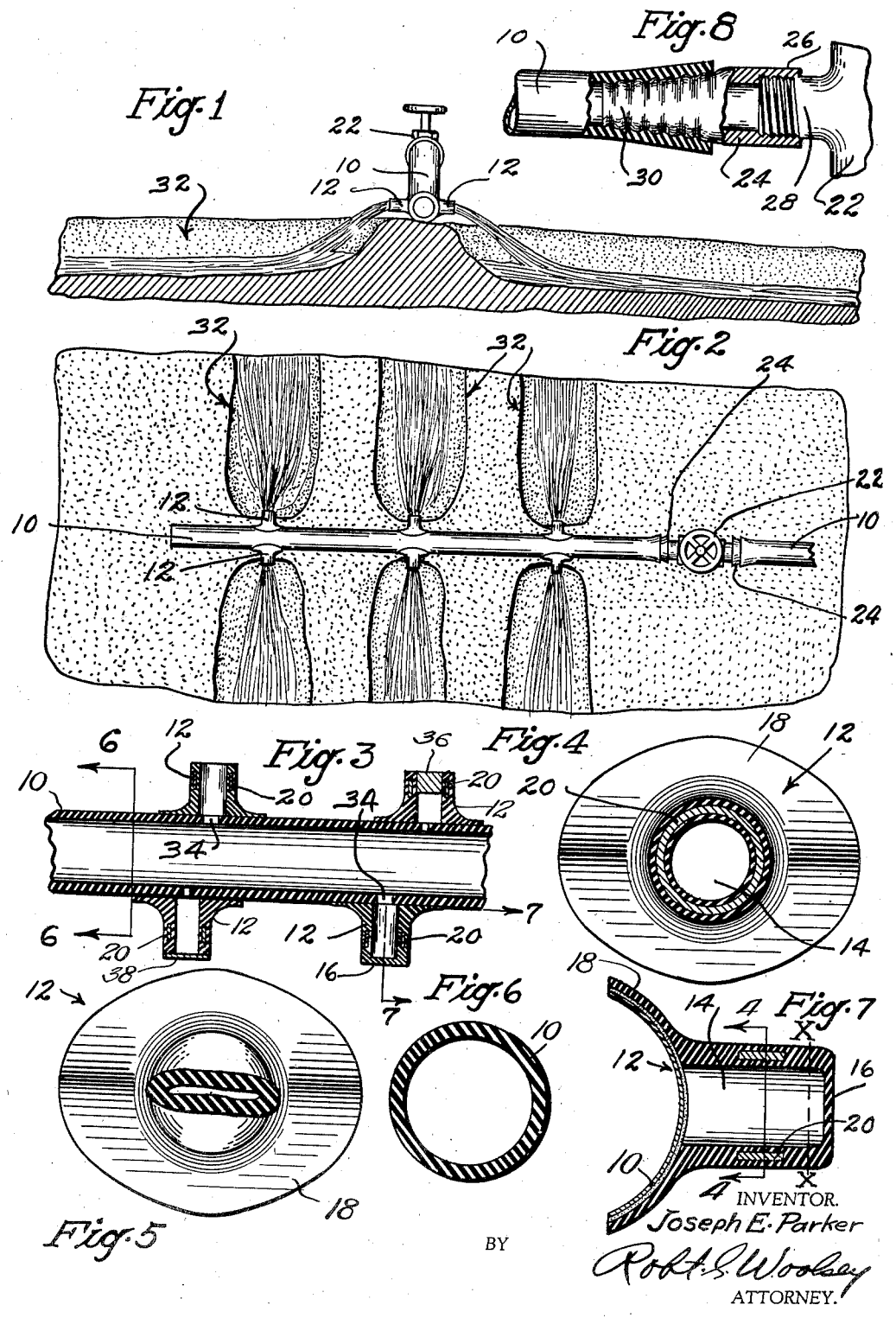
INVENTOR.
Joseph E. Parker
BY
Robt. S. Woolsey
ATTORNEY.

Patented Feb. 21, 1939

2,148,419

UNITED STATES PATENT OFFICE 2,148,419

IRRIGATION WATER DISTRIBUTOR

Joseph E. Parker, Yorba Linda, Calif.

Application November 15, 1937, Serial No. 174,618

2 Claims. (Cl. 299—154)

In irrigation of plants and trees, water is led to furrows in parallel with the plants or trees, either from an open ditch or from stand-pipes. In slightly rolling or in hill country it is customary to bring water to stand-pipes which are provided with a plurality of openings through which the water may flow to furrows which converge at the stand-pipe, and which diverge from the stand-pipe in such a manner as to lead the water to places of need.

The foregoing method has been in use for a long time, and while results may be obtained by acceptance of that method, nevertheless it represents an extravagant use of water because of losses due to seepage and evaporation. Also soil washing and erosion are constantly in operation by use of the above referred to method of irrigation. It might also be mentioned, that the nearest trees invariably receive an excess of water which represents a direct financial loss, as well as being harmful to the plants or trees being irrigated. In addition to the aforementioned disadvantages, the old method requires constant personal attention in order to keep the water moving, for there is a constant tendency for the furrows or ditches to become clogged, which condition represents a further financial loss to the grower.

With the foregoing facts in mind it is a prime object of the present invention to provide means to correctly distribute water to plants and trees without incidental losses as above referred to.

A further object of the invention is to provide lengths of tubing to which outlets may readily be attached to conform with the width of the furrows through which irrigation water is intended to flow.

A still further object of the invention is to provide means whereby the flow of water may be restricted by deformation of the water outlet without resort to valves as such.

A still further object of the invention is to provide means in combination with tubing whereby water outlets may be secured to the tubing in the field upon diametrically opposite sides of the tubing and in matched transverse alignment or in staggered relation, or in any variation to meet the conditions found in the field.

Other objects, features, and advantages of the invention may be observed from the accompanying drawing, specification, and the subjoined claims.

In the drawing of which there is one sheet:

Figure 1 is an end view of the device of this invention showing application of the water distributor.

Figure 2 is a plan view of the device of this invention in operation.

Figure 3 is a transverse sectional view showing water outlets secured to the tubing or manifold and in staggered relation.

Figure 4 is a sectional elevation taken on line 4—4, in Figure 7 showing the outlet spout and an annular, deformable ring imbedded within the walls of the outlet, the deformable ring being adapted to shape the outlet to the shape of the ring after being deformed for the purpose of varying the volume of water flowing therethrough.

Figure 5 is a view taken on approximately the same line as Figure 4, showing the outlet in deformed shape to restrict the outlet flow of water.

Figure 6 is a sectional view taken on line 6—6, Figure 3 showing the shape and construction of the tube or manifold.

Figure 7 is a sectional view taken on line 7—7, Figure 3 but drawn to an enlarged scale, and showing construction of the outlet spouts before the closed end thereof has been cut-away to permit passage of water.

Figure 8 is a view partially in section showing in detail the mode of fitting the tubing upon a fitting of one of the risers.

The device of this invention comprises a length of rubberized tubing 10, formed of rubber and fabric in the manner which is customary in the manufacture of rubber hose, and to which outlet nozzles 12 may be secured by cementing with a rubber solution. The tubing 10 is of standard construction and it is proposed that it be obtained on the open market in lengths which are adapted to conform with the service requirements.

The outlet nozzles 12 as shown in the drawing are formed in the shape of a cylinder 14 and are closed at one end with a closure member 16 which is formed integral with the nozzle 12. The opposite end of the outlet nozzle is provided with a flange 18 which is treated in the manner of the so called gasoline patch which is widely used for repair work on inner tubes of tires, thereby enabling the outlet nozzle to be affixed to the tubing 10 in a well known manner to provide a positive means of union between the tubing and the outlet.

The cylindrical portion of the outlet 12 is formed with a plastic ring 20 of metal moulded or otherwise firmly and securely placed within the wall of the cylindrical portion 14, so that if the outlet 12 should be deformed or misshapen as shown in Figure 5, then the rubberized material of which the outlet is formed will also assume the shape of the metal ring, for the natural resiliency of the rubberized material is insufficient to pull the metal ring 20 to its original form or shape.

To apply the device of this invention it is necessary that the tract to be irrigated be provided with risers 22 which connect with suitable sources of water. A fitting 24 having a threaded end 26 to engage the outlet 28 of the riser 22, is also provided with a tapered end 30 which is corrugated to provide a secure anchorage in the tubing which is slipped over the end thereof.

The width between furrows or ditches 32 is usually known afore-hand thereby enabling the operator to form openings 34 in the tubing 10 and to cement the outlet nozzles 12 over the opening before taking the tubing to location for use. The closure member 16 may be cut along line X—X to permit water to flow therethrough for the purpose intended, or it may be left unopened until such time as need may require.

It will be apparent the outlets may be arranged in any manner upon the tubing to suit the need or convenience of the operator. Likewise the opened ends of the outlets 12 may be temporarily closed by means of an inserted plug 36, or may be permanently closed by application of a rubber cemented patch 38.

If during the operation of irrigating it should be found that a particular ditch was receiving more water than necessary, it is only necessary to grasp the outlet 12 and to exert pressure upon it to contract its opening sufficiently to restrict the flow of water to the proper rate. If it should later be necessary to increase the rate of flow from the outlet, it is only necessary to insert a rounded tool to spread the side-walls of the outlet sufficiently to permit the proper rate of flow of water to again move through the outlet.

From the foregoing it will be apparent that I have provided a cheap and practicable means to distribute water upon tracts of land to be irrigated, for equipment which may by inadvertence rolled over the tubing will not permanently injure it by reason of its nature. Likewise, openings 34 in the tubing may be readily obtained to meet the particular requirements of the operator, and after use may either be temporarily sealed or may be permanently sealed as need may require.

It is obvious that various changes and modifications and variations may be made in practicing the invention in departure from the particular showing of the drawing and description as given, without, however, departing from the true spirit of the invention as defined by the scope of the appended claims.

I claim:

1. An outlet for water distributors, said outlet comprising a cylindrically shaped body portion, a closure on one end thereof, said closure being formed integrally with said body portion and being adapted to be severed therefrom, an annular flange formed upon the opposite end of said body and integrally therewith, said flange being coated on one side with a rubberized cement and then hermetically sealed.

2. An outlet for water distributors, said outlet comprising a cylindrically shaped body portion, a closure on one end thereof, said closure being formed integrally with said body portion and adapted to be severed therefrom, an annular flange formed upon the opposite end of said body and integrally therewith, said flange being coated on one side with a rubberized cement and then hermetically sealed, and a deformable plastic ring of metal formed within said body portion.

JOSEPH E. PARKER.